United States Patent [19]

Marshall

[11] Patent Number: 5,111,375
[45] Date of Patent: May 5, 1992

[54] CHARGE PUMP

[75] Inventor: Andrew Marshall, Dallas, Tex.

[73] Assignee: Texas Instruments Incorporated, Dallas, Tex.

[21] Appl. No.: 630,703

[22] Filed: Dec. 20, 1990

[51] Int. Cl.⁵ .............................................. H02M 7/00
[52] U.S. Cl. .......................................... 363/60; 363/59
[58] Field of Search .............................. 363/59, 60, 61

[56] References Cited

U.S. PATENT DOCUMENTS 4,186,436  1/1980  Ishiwatari ............................ 363/60
4,926,354  5/1990  Pattantyus ........................ 363/60 X

FOREIGN PATENT DOCUMENTS 0010166  1/1984  Japan ................................. 363/60 X
0026466  2/1986  Japan .

Primary Examiner—Steven L. Stephan
Assistant Examiner—Emanuel Todd Voeltz
Attorney, Agent, or Firm—B. Peter Barndt; Richard Donaldson; William E. Hiller

[57] ABSTRACT

A charge pump comprises high voltage and low voltage supply rails coupled to first and second capacitors via switching circuitry. The switching circuitry is operable to charge the first and second capacitors to desired voltages to generate a desired output voltage of increased magnitude.

20 Claims, 2 Drawing Sheets

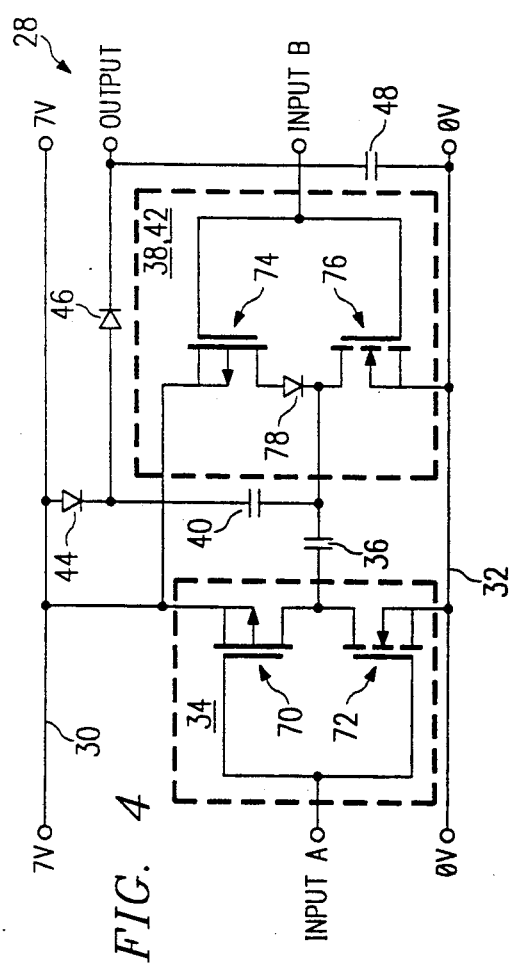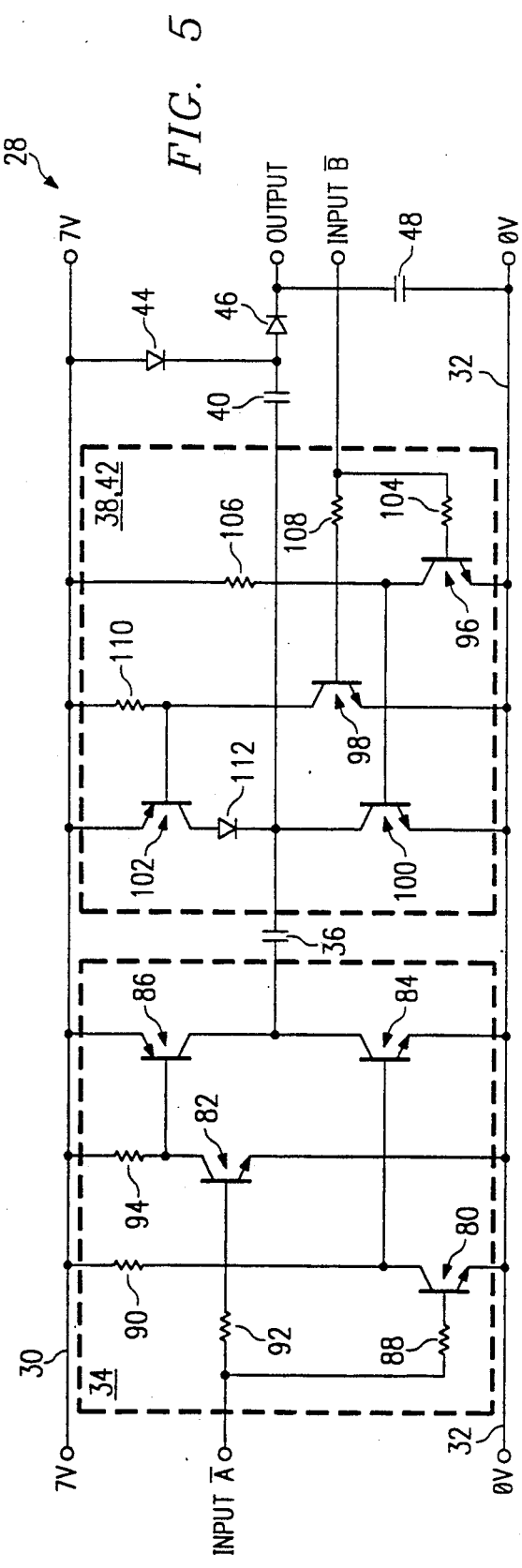

CHARGE PUMP

BACKGROUND OF THE INVENTION

In many circuits, it is necessary to generate a voltage which is greater in magnitude than the supply voltage. For example, in order to efficiently drive DMOS output structures of MOS based power IC's, it is necessary to supply a gate-to-source voltage of typically 10-15 volts. In many high-side drive and low-side drive intelligent power switches, a voltage tripler is normally required, as the bulk of intelligent power switch designs are for the automotive market, where operating voltage may be as low as 4.5 volts. At this voltage, most DMOS structures are not functional, or have a very high on resistance. A voltage doubler would normally provide about 7 volts, with a supply voltage of 4.5 volts, when diode and saturation losses are taken into account. This is normally insufficient to fully turn on a DMOS output, so a tripler is required. Other circuits, such as EPROMS and EEPROMS, require a programming voltage ($V_{pp}$) of 12-17 volts to be generated from a five volt supply.

Typically, charge pumps (also referred to as "voltage multipliers") are used to generate a voltage of increased magnitude. Present day charge pumps comprise a series of stages, each stage including a capacitor and a MOS or junction diode. Each stage of the charge pump boosts the magnitude of the voltage signal by a voltage equal approximately to the voltage swing of a clock signal applied to the capacitor less the threshold voltage of the diode. At each stage, the capacitor will see an increased maximum voltage difference across its plates. For example, using a seven volt supply, the first capacitor will see a difference of seven volts across its plates and the capacitor of the second stage will see a maximum voltage difference of fourteen volts across its plates. Subsequent stages would result in additional increased voltage across the capacitors. The magnitude of voltage across the capacitor will determine its structure and size. Consequently, by limiting the voltage across the capacitors, the density of the circuit can be increased and the complexity of the fabrication may be decreased.

Therefore, a need has arisen in the industry for a charge pump using low voltage capacitors.

SUMMARY OF THE INVENTION

In accordance with the present invention, a charge pump is provided which substantially eliminates the problems associated with prior such devices.

The charge pump of the present invention provides high and low voltage supply rails having a predetermined voltage differential. First and second capacitors are coupled in series. Switching circuitry is coupled to the high voltage and low voltage supply rails and to the first and second capacitors, and is operable to selectively charge the first and second capacitors to desired voltages to generate a desired output voltage.

The present invention provides significant advantages over the prior art. By selectively charging the series capacitors, the increased voltage can be obtained by using low voltage capacitors, thereby decreasing the complexity of the circuit design and increasing the density of the device.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 illustrates a schematic representation of a MOS implementation of the charge pump of FIG. 2;

FIG. 5 illustrates a schematic representation of a bipolar implementation of the charge pump of FIG. 2; and FIG. 6 illustrates the timing diagrams for the input waveforms for the charge pump of FIGS. 4 and 5.

DETAILED DESCRIPTION OF THE INVENTION

The preferred embodiment of the present invention and its advantages are best understood by referring to FIGS. 1-6 of the drawings, like numerals being used for like and corresponding parts of the various drawings.

Figure 1:
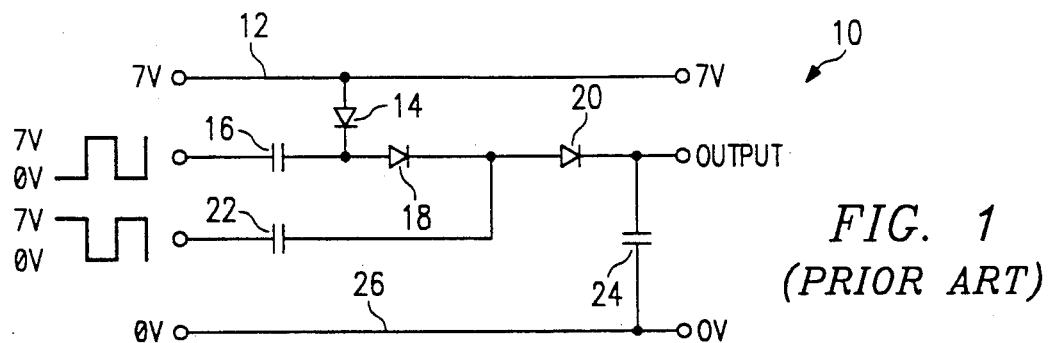
FIGURE 1 illustrates a schematic representation of a prior art charge pump.

FIG. 1 illustrates a schematic representation of the prior art charge pump circuit 10. The high voltage supply rail 12 (shown at seven volts) is coupled to the anode of diode 14. The cathode of diode 14 is coupled to the first plate of capacitor 16 and to the anode of diode 18. The second plate of capacitor 16 is coupled to a clock signal. The cathode of diode 18 is coupled to the anode of diode 20 and to the first plate of capacitor 22. The second plate of capacitor 22 is coupled to a clock signal (typically a square wave) which is 180° out of phase with the clock signal coupled to capacitor 16. The cathode of diode 20 is coupled to the first plate of a capacitor 24 having a second plate coupled to the low voltage supply rail 26 (shown at zero volts) for a low side driver case. The output voltage is taken across capacitor 24. The capacitor may also be coupled between the cathode of diode 20 and the high voltage rail, or between the cathode of diode 20 and another voltage node.

For simplicity of explanation, the operation of the charge pump will be described without taking into account the voltage drops across the diodes 14, 18 and 20. Typically, however, the diodes will each account for a voltage drop of approximately 0.7 volts for a junction diode and a voltage drop which is significantly higher for a MOS diode. Initially, it is assumed that the voltage at the cathodes of diodes 14, 18 and 20 is seven volts, generated by the high voltage supply rail 12. The clock signal coupled to capacitor 16 is initially at zero volts and the clock signal coupled to capacitor 22 is initially at seven volts. As the clock coupled to capacitor 16 transitions from zero volts to seven volts, the voltage at the cathode of diode 14 is boosted from seven volts to fourteen volts. Consequently, the voltages at the cathodes of diodes 18 and 20 are also boosted to fourteen volts. When the clock coupled to capacitor 16 transitions from zero volts to seven volts, the clock coupled to capacitor 22 transitions from seven volts to zero volts. As the clock transitions from zero volts to seven volts, the voltage at the cathode of diode 18, and consequently the voltage at the cathode of diode 20, is boosted to twenty-one volts. Hence, the voltage supplied by the voltage rails 12 and 26 is essentially tripled.

As can be seen, the voltage across capacitor 22 may be as great as fourteen volts. If additional stages were used, each capacitor would have an increased voltage across it. Hence, high voltage capacitors must be used.

Figure 2:
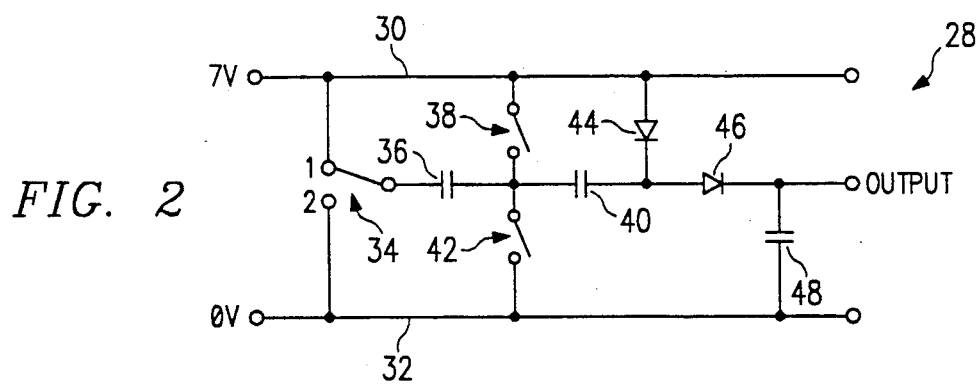
FIG. 2 illustrates a schematic representation of a preferred embodiment of the charge pump of the present invention.

FIG. 2 illustrates a schematic representation of the preferred embodiment of the charge pump of the present invention. The charge pump 28 has high voltage and low voltage supply rails 30 and 32, shown at seven volts and zero volts, respectively. A first switch 34 selectively couples a first plate of capacitor 36 to one of the supply rails 30 or 32. Switch 38 selectively couples the high voltage supply rail 30 to the second plate of capacitor 36 and to the first plate of capacitor 40. Similarly, switch 42 selectively couples the low voltage supply rail to the second plate of capacitor 36 and the first plate of capacitor 40. Diode 44 has an anode connected to the high voltage supply rail 30 and a cathode coupled to the second plate of capacitor 40. Diode 46 has an anode coupled to the cathode of diode 44 and an cathode coupled to the first plate of capacitor 48. The second plate of capacitor 48 is coupled to the low voltage supply rail 32 (or to the high voltage rail, if desired, or to another voltage node). If the charge pump 28 is coupled to a DMOS transistor, the gate/source and gate/drain capacitances can be used as capacitor 48 by coupling the cathode of diode 46 to the gate of the DMOS transistor. The operation of the charge pump 28 will be discussed in connection with TABLE 1.

TABLE 1

| STEP | Switch 34 | Switch 38 | Switch 42 |
|---|---|---|---|
| 1 | 2 | CLOSED | OPEN |
| 2 | 1 | OPEN | OPEN |
| 3 | 2 | OPEN | CLOSED |
| 4 | 2 | CLOSED | OPEN |
| 5 | 1 | OPEN | OPEN |
| 6 | 2 | OPEN | CLOSED |

Initially, it is presumed that capacitors 36, 40 and 48 are discharged to zero volts. In step 1, switch 34 couples the low voltage supply rail to the first plate of capacitor 36, switch 38 is closed, and switch 42 is open. Hence, capacitor 36 is charged to seven volts. In step 2, the high voltage supply rail 30 is coupled to the first plate of capacitor 36, switch 38 is open and switch 42 is open. Hence, the first plate of capacitor 36 is at seven volts, the second plate of capacitor 36 is boosted to fourteen volts. The first and second plates of capacitor 40 are likewise boosted to fourteen volts. In step 3, switch 34 couples the low voltage supply rail 32 to the first plate of capacitor 36, switch 38 is open and switch 42 is closed. Hence, capacitor 36 is discharged to zero volts, and capacitor 40 is charged to seven volts. The sequence of the first three steps puts the charge pump 28 in the desired initial condition.

The three-step cycle described above is repeated in steps 4-6. In step 4, the first capacitor is charged to seven volts, generating a fourteen volt potential across the two capacitors 36 and 40. In step 5, the high voltage supply rail 30 is coupled to the first plate of capacitor 36, thereby boosting the voltage on the second plate of capacitor 36 to fourteen voltages and boosting the voltage on the second plate of capacitor 40 to twenty-one volts. Hence, capacitor 48 is charged to twenty-one volts. In step 6, capacitor 36 is discharged, preparing the charge pump for the next cycle. The three-step cycle may be repeated as often as necessary to maintain the desired voltage across capacitor 48.

As can be seen, no more than seven volts is placed across either capacitor 36 or 40. Additional capacitors could be provided in series along with respective switches to the high and low rails 30 and 32 in order to further increase the generated output voltage. Even with additional capacitors, no capacitor in the series would need to handle more than seven volts. Hence, only one capacitor, capacitor 48, needs to be a high voltage capacitor.

Figure 3:
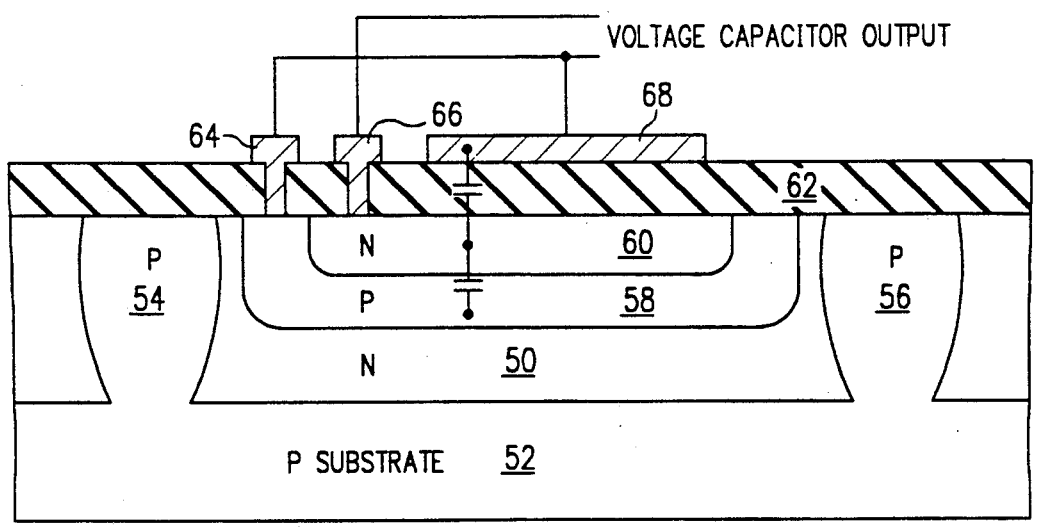
FIG. 3 illustrates a cross-sectional side view of a base-emitter capacitor which may be used in the present invention.

Consequently, a low voltage capacitor structure, such as that shown in FIG. 3, may be used to implement the series capacitors 36 and 40. FIG. 3 illustrates a cross-sectional side view of structure readily available in bipolar, biCMOS, and similar integrated circuit processes. An n tank region 50 is formed in a substrate 52. The n tank region is isolated by p regions 54 and 56. A p type diffused region 58 is formed in the n tank 50 and an n type diffused region 60 is formed in the p type diffused region 58. The p type and n type diffused regions 58 and 60 may be formed in conjunction with the base and emitter diffusions of an npn transistor. An oxide layer 62 overlies the structure with contacts 64 and 66 providing an electrical coupling to the p type diffused region 58 and the n type diffused region 60, respectively. The base/emitter capacitor formed by the n type diffused region 60 and p type diffused region 58 is well suited for implementing the seven-volt capacitors 36 and 40. An emitter/metal capacitor can also be implemented by forming a metal layer 68 on the emitter 60.

FIG. 4 illustrates a MOS implementation of the charge pump 28 of FIG. 2. In this embodiment, switch 34 is implemented by PMOS transistor 70 and NMOS transistor 72. The gates of transistors 70 and 72 are coupled to an input A (shown in FIG. 6). The source of PMOS transistor 70 is connected to the high voltage supply rail 30 and the source of NMOS transistor 72 is connected to the low voltage supply rail 32. The drains of the transistors 70 and 72 are coupled to the first plate of capacitor 36.

Switches 38 and 42 are implemented by PMOS transistor 74, NMOS transistor 76 and diode 78. The gates of transistors 74 and 76 are connected an input B (shown in FIG. 6). The sources of transistors 74 and 76 are coupled to the high voltage rail 30 and the low voltage rail 32, respectively. The drain of transistor 74 is coupled to the anode of diode 78. The cathode of diode 78 is coupled to the drain of transistor 76.

The operation of the charge pump 28 shown in FIG. 4 will be discussed in connection with the timing diagram shown in FIG. 6. At $t_0$, input A is high and input B is low. With input A high, the NMOS transistor 72 is enabled and the PMOS transistor 70 is disabled, thereby coupling the low voltage supply rail 32 to the first plate of capacitor 36. With input B low, PMOS transistor 74 is enabled and the NMOS transistor 76 is disabled, thereby coupling the high voltage supply rail 30 to the second plate of capacitor 36 and the first plate of capacitor 40. At $t_1$, input A transitions low while input B remains low. A low voltage on input A enables PMOS transistor 70 and disables NMOS transistor 72, thereby coupling the high voltage supply line 30 to the first plate of capacitor 36. Consequently, the voltage on the second plate of capacitor 36 is boosted to fourteen volts, causing diode 78 to decouple the high voltage supply line 30 from the second plate of capacitor 36 and the first plate of capacitor 40, even though transistor 74 is still enabled.

At $t_2$, inputs A and B both transition high, enabling NMOS transistors 72 and 76 and disabling PMOS transistors 70 and 74. Hence, the first plate of capacitor 36 is coupled to zero volts and the second plate of capacitor 36 and the first plate of capacitor 40 are coupled to zero volts. As can be seen from FIG. 6, inputs A and B repeat the three-stage cycle continuously.

FIG. 5 illustrates a embodiment of the charge pump 28 which is implemented using bipolar technology. In this implementation, switch 34 is implemented using npn transistors 80, 82, and 84, and pnp transistor 86. The base of transistor 80 is coupled to input $\overline{A}$ (the inversion of clock signal A illustrated in FIG. 6) via resistor 88. The collector of transistor 80 is coupled to the high supply line 30 via resistor 90, and to the base of transistor 84. The emitter of transistor 80 is coupled to the low voltage supply rail 32. The base of transistor 82 is coupled to input $\overline{A}$ via resistor 92. The collector of transistor 82 is coupled to the high voltage supply rail 30 via resistor 94 and to the base of transistor 86. The emitter of transistor 82 is coupled to the low voltage supply rail 32. The collector of transistor 84 is connected to the collector of transistor 86. The emitter of transistor 84 is coupled to the low voltage supply rail 32 and the emitter of transistor 86 is coupled to the high voltage supply rail 30.

Switches 38 and 42 are implemented using npn transistors 96, 98 and 100 and pnp transistor 102. The base of npn transistor 96 is coupled to input $\overline{B}$ (the inversion of clock signal B of FIG. 6) via resistor 104. The collector of transistor 96 is coupled to the high voltage supply rail 30 via resistor 106 and to the base of transistor 100. The emitter of transistor 96 is coupled to the low voltage supply rail 32. The base of transistor 98 is coupled to input $\overline{B}$ via resistor 108. The collector of transistor 98 is coupled to the high voltage supply rail 30 via resistor 100 and to the base of transistor 102. The emitter of transistor 98 is coupled to the low voltage supply rail 32. The collector of transistor 100 is connected to the cathode of diode 112. The anode of diode 112 is connected to the collector of transistor 102. The emitter of transistor 102 is coupled to the high voltage supply rail 30 and the emitter of transistor 100 is connected to the low voltage supply rail 32.

The operation of the charge pump 28 of FIG. 5 is similar to the operation of the charge pump of FIG. 4. When input $\overline{A}$ is low, the first plate of capacitor 36 is coupled to the low voltage supply rail 32 and when input $\overline{A}$ is high, the high voltage supply rail 30 is coupled to the first plate of capacitor 36. Similarly, when input $\overline{B}$ is low, the low voltage supply rail 32 is coupled to the second plate of capacitor 36 and to the first plate of capacitor 40. When input $\overline{B}$ is high, the high voltage supply rail 30 is coupled to the second plate of capacitor 36 and the first plate of capacitor 40, unless the voltage at the cathode of diode 112 is greater than seven volts, in which case neither supply rail is coupled to the capacitors 36 and 40.

In the preferred embodiment, the seven-volt rail is internally generated, for example, using a Zener regulator. Further, a switch may be included in series with diode 44, 46 or with the output node. This switch would be used for the purpose of switching off the device coupled to the output of the charge pump 28.

The present invention allows a charge pump to be implemented using low voltage capacitors, fabricated using standard processes. The use of low voltage capacitors decreases the size of the devices and the complexity of fabricating the capacitors.

Although the present invention and its advantages have been described in detail, it should be understood that various changes, substitutions and alterations can be made herein without departing from the spirit and scope of the invention as defined by the appended claims.

What is claimed is:

1. A charge pump comprising:
   high voltage and low voltage supply rails having a predetermined voltage differential;
   first and second capacitors coupled in series;
   first switching circuitry coupled to said high voltage and low voltage supply rails and said first and second capacitors, said first switching circuitry operable to selectively charge said first and second capacitors to desired voltages; and
   second switching circuitry coupled to said high voltage and low voltage supply rails and to said first capacitor, said second switching circuitry operable to selectively couple said first capacitor to said high and low voltage supply rails to said first capacitor so as to generate a desired output voltage.

2. The charge pump of claim 1 and further comprising a third capacitor operatively coupled between the second capacitor and one of said supply rails.

3. The charge pump of claim 1 and further comprising a third capacitor operatively coupled between the second capacitor and a voltage node.

4. The charge pump of claim 3 wherein said third capacitor comprises the gate of a DMOS transistor.

5. The charge pump of claim 2 and further comprising a diode coupled between said second and third capacitors to prevent a charge transfer from said third capacitor to said second capacitor.

6. The charge pump of claim 1 wherein said switching circuitry further comprises a first switch selectively coupling a first plate of said first capacitor to said high voltage and low voltage supply rails.

7. The charge pump of claim 6 wherein said switching circuitry further comprises a second switch for selectively coupling a second plate of said first capacitor and a first plate of said second capacitor to the high voltage supply rail or to the low voltage supply rail.

8. The charge pump of claim 7 wherein said second switch is operable to decouple said second plate of the first capacitor and the first plate of the second capacitor from both the high and low voltage supply rails.

9. The charge pump of claim 6 wherein said first switch comprises a PMOS transistor and an NMOS transistor having gates coupled to a clock signal, sources coupled to the high voltage and low voltage supply rails, respectively, and drains coupled to the first plate of said first capacitor.

10. The charge pump of claim 7 wherein said second switch comprises a PMOS transistor and an NMOS transistor having gates coupled to a second clock signal, sources coupled to the high voltage and low voltage supply rails, respectively, and drains coupled to the second plate of said first capacitor and to the first plate of said second capacitor.

11. The charge pump of claim 10 and further comprising a diode coupled between the drains of the PMOS and NMOS transistors.

12. The charge pump of claim 6 wherein said first switch comprises a pnp and a npn transistor having bases driven responsive to a clock signal, emitters coupled to said high and low voltage rails, respectively, and collectors coupled to the first plate of said first capacitor.

13. The charge pump of claim 7 wherein said second switch comprises a pnp and a npn transistor having bases driven responsive to a clock signal, emitters coupled to said high and low voltage rails, respectively, and collectors coupled to the second plate of said first capacitor and the first plate of said second capacitor.

14. The charge pump of claim 13 and further comprising a diode coupled between the collectors of said pnp and npn transistors.

15. A method of multiplying a supplied voltage comprising the steps of:
   providing first and second capacitors, said first and second capacitors each comprising first and second plates, said first plate of said second capacitor coupled to the second plate of said first capacitor;
   providing first switching circuitry operable to selectively couple said first plate of said second capacitor and said second plate of said first capacitor to a high voltage supply rail and alternatively to a low voltage supply rail;
   providing second switching circuitry operable to selectively couple said first plate of said first capacitor to said high voltage supply rail and alternatively to said low voltage supply rail;
   charging said second capacitor to a first predetermined voltage;
   charging said first capacitor to a second predetermined voltage, such that said voltage across said first and second capacitors is substantially equal to the sum of said first and second predetermined voltages; and
   increasing the voltage at said first plate of said first capacitor, thereby increasing the voltage output from the second plate of said second capacitor.

16. The method of claim 15 and further comprising the step of charging a third capacitor responsive to the voltage on the second plate of said second capacitor.

17. The method of claim 15 wherein said first predetermined voltage equals said second predetermined voltage.

18. The method of claim 15 wherein said step of charging said second capacitor comprises the step of selectively coupling said second capacitor between high and low voltage rails.

19. The method of claim 18 wherein said step of charging said first capacitor comprises the step of selectively coupling the first capacitor between said high and low supply rails.

20. The method of claim 19 wherein said step of increasing the voltage at said first plate of said first capacitor comprises the step of switching the first plate of said first capacitor from said low voltage supply rail to said high voltage supply rail.

* * * * *